Patented Apr. 18, 1939

2,155,360

UNITED STATES PATENT OFFICE 2,155,360

DYESTUFFS OF THE ANTHRAQUINONE SERIES

Ralph N. Lulek, Milwaukee, and Clarence F. Belcher, South Milwaukee, Wis., assignors to E. I. du Pont de Nemours & Company, Wilmington, Del., a corporation of Delaware No Drawing. Application December 22, 1937, Serial No. 181,162

3 Claims. (Cl. 260—274)

This invention relates to the preparation of new dyestuffs of the anthraquinone series and more particularly to the preparation of new gray vat dyestuffs which exhibit good fastness properties, and which are obtainable by the alkaline condensation of intermediate compounds of the formula

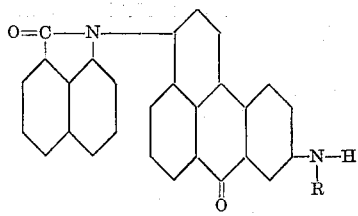

wherein R stands for a vattable anthraquinone group.

While a number of compounds of the anthraquinone series have been described, which when dyed on cotton in heavy shades build up to give good blacks, these dyestuffs in general when dyed in lighter shades do not give satisfactory grays, and a diligent attempt has therefore been made to prepare dyestuffs which will dye cotton fiber in neutral gray shades of good fastness properties.

We have found that new and valuable gray dyeing colors can be prepared by condensing one mole of the alkali-metal salt of naphthostyril with 6-Bz-1-dibromobenzanthrone with which the naphthostyril compound combines in the Bz-1 position and then condensing with this intermediate a vattable aminoanthraquinone compound, such as alpha- or beta-aminoanthraquinone, the simple substituted alpha- or beta-aminoanthraquinones, acidylamino substituted anthraquinones, and the simple ring substitution derivatives of aminoanthraquinone such as the anthraquinone-2,1N-benzachridones, thioxanthrones, the 1,2- and 2,3-anthraquinone oxazoles and thiazoles, etc., and subsequently alkali fusing the 6-anthraquinonyl-imino-Bz-1-N-benzanthronylnaphthostyril. The alkali fusion may be carried out dry or in alcohol or other diluents.

While the exact structural formula of the resulting dyestuffs has not been definitely proved, it is believed that the alkali condensation effects a ring-closure of the naphthostyril radical with the 2 position of the benzanthrone group, giving a pyridine ring. It is also possible that ring-closure of the 6-anthraquinonyl benzanthronyl imide to a carbozole or an acridine takes place, although this has not been definitely ascertained.

The following examples are given to illustrate the invention more fully. The parts used are by weight.

Example 1

10 parts of naphthostyril sodium salt, 18 parts of 6-Bz-1-dibromobenzanthrone, 5 parts of potassium carbonate, 0.2 part of copper carbonate are heated together in 180 parts of nitrobenzene for six hours at 195-200° C. The charge is allowed to cool and is diluted with 90 parts of nitrobenzene, then 10 parts of potassium carbonate, 4 parts of copper carbonate, and 15.8 parts of 5-amino-2,1N-anthraquinonebenzacridone are added and the charge stirred and heated at 200 to 207° C. for 18 to 20 hours. Upon cooling, the charge is diluted with alcohol, then steam distilled to remove the solvent, filtered, and washed. The residual cake is slurried in hot dilute hydrochloric acid to remove copper salts, filtered, washed free from acid, and dried.

To a stirred melt prepared from 100 parts of caustic potash and 48 parts of methanol at 135° C., there are charged 20 parts of the above condensate over a period of 15 to 30 minutes. The charge is then maintained at 135 to 140° C. for about 2 hours, drowned in water, and the resulting solution heated and aerated until all leuco body is oxidized. It is then filtered, washed free from alkali, and dried. It is a dark powder which dyes cotton in gray shades from an alkaline hydrosulfite vat.

In the above example 1-aminoanthraquinone, 2-aminoanthraquinone, 1-amino-4-(or 5) anilinoanthraquinone, 1-amino-5-benzoylaminoanthraquinone, 1-amino-4-benzoylaminoanthraquinone, 4- or 8-amino-2,1N-anthraquinonebenzacridone or the corresponding thioxanthones may be substituted for the 5-amino-2,1N-anthraquinonebenzacridones to give dyestuffs which dye in similar neutral gray shades and which exhibit the same good fastness properties.

In the expression "vattable anthraquinone group", we include those anthraquinone compounds which can be vatted with alkaline hydrosulfite under normal vat dyeing conditions, either hot or cold, as illustrated by the compounds specifically mentioned above.

We claim:

1. The dyestuffs obtained by the alkaline condensation of 6-anthraquinonylamino-Bz-1N-benzanthronylnaphthostyrils of the following general formula

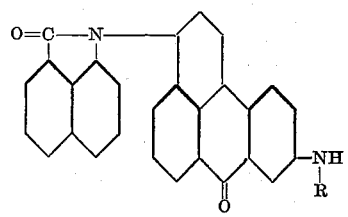

wherein R stands for a radical of the anthraquinone class, and which dye cotton from an alkaline hydrosulfite vat in neutral gray shades of good fastness properties.

2. The anthraquinone vat dyestuff obtained by the alkaline condensation of the 6-anthraquinonylamino-Bz-1N-benzanthronylnaphthostyril of the following formula

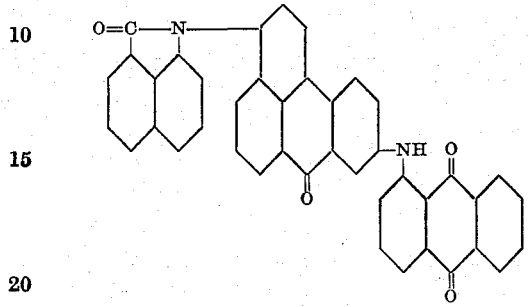

which dyes cotton from an alkaline hydrosulfite vat in gray shades of good fastness properties.

3. The anthraquinone vat dyestuff obtained by the alkaline condensation of the 6-(5'-anthraquinone-2',1'N-benzacridoneamino)Bz-1N-benzanthronylnaphthostyril of the formula

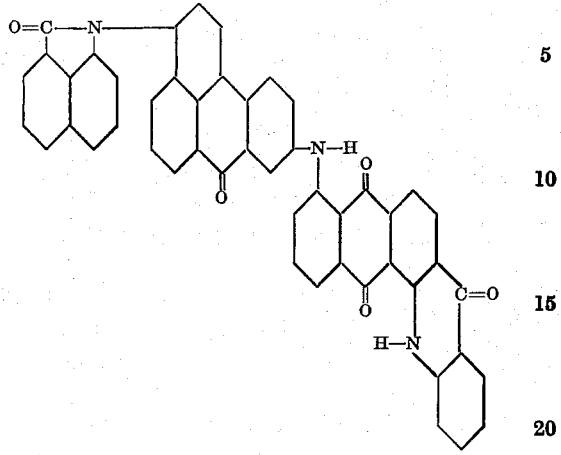

which dyes cotton from an alkaline hydrosulfite vat in gray shades of good fastness properties.

RALPH N. LULEK.
CLARENCE F. BELCHER.